United States Patent
Ni et al.

(10) Patent No.: US 12,438,955 B2
(45) Date of Patent: Oct. 7, 2025

(54) CHAOS ENGINEERING EXPERIMENTATION METHOD FOR SYSTEM, DEVICE AND STORAGE MEDIUM

(71) Applicant: Beijing Zitiao Network Technology Co., Ltd., Beijing (CN)

(72) Inventors: Weijie Ni, Beijing (CN); Jinlie Lin, Beijing (CN); Ming Zhou, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/256,361

(22) PCT Filed: Dec. 1, 2021

(86) PCT No.: PCT/CN2021/134890
§ 371 (c)(1),
(2) Date: Jun. 7, 2023

(87) PCT Pub. No.: WO2022/135094
PCT Pub. Date: Jun. 30, 2022

(65) Prior Publication Data
US 2024/0022646 A1  Jan. 18, 2024

(30) Foreign Application Priority Data

Dec. 23, 2020  (CN) .......................... 202011540273.7

(51) Int. Cl.
*H04L 41/0631* (2022.01)
*H04L 41/069* (2022.01)
(Continued)

(52) U.S. Cl.
CPC .......... *H04L 67/60* (2022.05); *H04L 41/0631* (2013.01); *H04L 41/069* (2013.01); *H04L 41/145* (2013.01); *H04L 43/50* (2013.01)

(58) Field of Classification Search
CPC ... H04L 67/60; H04L 41/0631; H04L 41/069; H04L 41/145; H04L 43/50; H04L 43/00; G06F 11/36
(Continued)

(56) References Cited

U.S. PATENT DOCUMENTS 11,128,699 B1 *  9/2021  Khurrum ............ G06F 9/45558
11,133,999 B1 *  9/2021  Brosnan ............... H04L 43/0894
(Continued)

FOREIGN PATENT DOCUMENTS

CN  109558152 A  4/2019
CN  110333884 A  10/2019
(Continued)

OTHER PUBLICATIONS

China National Intellectual Property Administration, Office Action and Search Report Issued in Application No. 202011540273.7, Mar. 1, 2023, 2 pages.
(Continued)

*Primary Examiner* — Karen C Tang
(74) *Attorney, Agent, or Firm* — Alleman Hall & Tuttle LLP (57) ABSTRACT

A chaos engineering experimentation method for a system, a device and a storage medium. Minimum experimental traffic of a service request required by a chaos engineering experiment is determined as target service request traffic; service request traffic is adjusted for a canary cluster in a to-be-tested server cluster according to the target service request traffic, where the canary cluster is a cluster formed by servers in the to-be-tested server cluster, the servers being used for canary release when a service is upgraded; an experimental task of the chaos engineering experiment is executed in the canary cluster, and an experimental result is outputted. The chaos engineering experiment is conducted
(Continued)

on the canary cluster, and the service request traffic of the canary cluster is adjusted to the minimum experimental traffic of the service request required by the chaos engineering experiment.

16 Claims, 6 Drawing Sheets

(51) Int. Cl.
    *H04L 41/14* (2022.01)
    *H04L 43/50* (2022.01)
    *H04L 67/60* (2022.01)

(58) Field of Classification Search
    USPC ........................................... 709/231
    See application file for complete search history.

(56) References Cited

U.S. PATENT DOCUMENTS

| | | | | |
|---|---|---|---|---|
| 2016/0191349 A1* | 6/2016 | Buege | ................ | H04L 41/5067 709/224 |
| 2019/0052531 A1* | 2/2019 | Sividia | ................ | G06F 9/5066 |
| 2020/0057714 A1 | 2/2020 | Ounce et al. | | |
| 2020/0112487 A1 | 4/2020 | Inamdar et al. | | |
| 2020/0280576 A1* | 9/2020 | Key | ................ | H04L 63/20 |
| 2020/0379839 A1* | 12/2020 | Savalle | ................ | H04L 12/4633 |
| 2020/0382385 A1* | 12/2020 | Vasseur | ................ | H04L 41/142 |
| 2021/0152494 A1* | 5/2021 | Johnsen | ................ | H04L 47/33 |
| 2021/0320869 A1* | 10/2021 | Bourai | ................ | H04L 47/125 |

FOREIGN PATENT DOCUMENTS

| | | |
|---|---|---|
| CN | 110765023 A | 2/2020 |
| CN | 112685290 A | 4/2021 |

OTHER PUBLICATIONS

China National Intellectual Property Administration, International Search Report and Written Opinion Issued in Application No. PCT/CN2021/134890, Feb. 25, 2022, WIPO, 14 pages.

\* cited by examiner

CHAOS ENGINEERING EXPERIMENTATION METHOD FOR SYSTEM, DEVICE AND STORAGE MEDIUM

CROSS-REFERENCE TO RELATED APPLICATIONS

This application is a National Stage of International Application No. PCT/CN2021/134890, filed on Dec. 1, 2021, which claims priority to Chinese Patent Application No. 202011540273.7, filed to the China National Intellectual Property Administration on Dec. 23, 2020 and entitled "CHAOS ENGINEERING EXPERIMENTATION METHOD FOR SYSTEM, DEVICE AND STORAGE MEDIUM". Both of the above applications are hereby incorporated by reference in their entireties.

TECHNICAL FIELD

Embodiments of the present disclosure relate to the field of computer technologies and, in particular, to a chaos engineering experimentation method for a system, a device and a storage medium.

BACKGROUND

Chaos Engineering is a discipline of experimenting on a distributed system in order to build capability and confidence of the system to withstand runaway conditions, or turbulent conditions in a production environment. By conducting a chaos engineering experiment on the distributed system, it is possible to determine whether there are defects in the distributed system, so as to understand how the system behaves under chaotic production-like environmental conditions.

When a chaos engineering experiment is conducted on a distributed system, various failures will usually be simulated in the system randomly and the disaster tolerance capability of the system is determined through the system state, so as to determine whether the system is stable. If a real situation of the system is desired, conducting the chaos engineering experiment in the production environment has the best effect. However, if the chaos engineering experiment is executed in the production environment, the production environment will not be able to provide a service to users normally, which will seriously affect user experience. If the chaos engineering experiment is executed in a testing environment, observability and coverage of the chaos engineering experiment are insufficient because of the small service request traffic and limited service request traffic types in the testing environment.

SUMMARY

Embodiments of the present disclosure provide a chaos engineering experimentation method for a system, a device and a storage medium to conduct a chaos engineering experiment in a production environment, so as to realistically and accurately detect disaster tolerance capability of the system while meeting observability requirements of the chaos engineering experiment and minimizing an impact on user experience.

In a first aspect, an embodiment of the present disclosure provides a chaos engineering experimentation method for a system, including:

determining target service request traffic, where the target service request traffic is minimum experimental traffic of a service request required by a chaos engineering experiment;

adjusting service request traffic for a canary cluster in a to-be-tested server cluster according to the target service request traffic; where the canary cluster is a cluster formed by servers in the to-be-tested server cluster, the servers being used for canary release when a service is upgraded;

executing an experimental task of the chaos engineering experiment in the canary cluster, and outputting an experimental result.

In a second aspect, an embodiment of the present disclosure provides a chaos engineering experimentation device for a system, including:

a traffic determination unit, configured to determine target service request traffic, where the target service request traffic is minimum experimental traffic of a service request required by a chaos engineering experiment;

a traffic adjustment unit, configured to adjust service request traffic for a canary cluster in a to-be-tested server cluster according to the target service request traffic; where the canary cluster is a cluster formed by servers in the to-be-tested server cluster, the servers being used for canary release when a service is upgraded;

an experimentation unit, configured to execute an experimental task of the chaos engineering experiment in the canary cluster, and output an experimental result.

In a third aspect, an embodiment of the present disclosure provides an electronic device, including: at least one processor and a memory;

where the memory stores computer-execution instructions;

the at least one processor executes the computer-execution instructions stored in the memory to cause the at least one processor to execute the chaos engineering experimentation method for a system according to the first aspect above and various possible designs of the first aspect.

In a fourth aspect, an embodiment of the present disclosure provides a computer-readable storage medium, where the computer-readable storage medium stores computer-execution instructions, and when a processor executes the computer-execution instructions, the chaos engineering experimentation method for a system according to the first aspect above and various possible designs of the first aspect is implemented.

In a fifth aspect, an embodiment of the present disclosure provides a computer program product including computer instructions, where the chaos engineering experimentation method for a system according to the first aspect above and various possible designs of the first aspect is implemented when the computer instructions are executed by a processor.

In a sixth aspect, an embodiment of the present disclosure provides a computer program, where the chaos engineering experimentation method for a system according to the first aspect above and various possible designs of the first aspect is implemented when the computer program is executed by a processor.

Embodiments of the present disclosure provide a chaos engineering experimentation method for a system, a device, a storage medium, a computer program product and a computer program. Target service request traffic is determined, where the target service request traffic is minimum experimental traffic of a service request required by a chaos engineering experiment; service request traffic is adjusted for a canary cluster in a to-be-tested server cluster according to the target service request traffic, where the canary cluster is a cluster formed by servers in the to-be-tested server cluster, the servers being used for canary release when a service is upgraded; an experimental task of the chaos engineering experiment is executed in the canary cluster, and an experimental result is outputted. In the embodiments, the chaos engineering experiment is conducted on the canary cluster, and the service request traffic of the canary cluster is adjusted to the minimum experimental traffic of the service request required by the chaos engineering experiment. In this way, it can be achieved that disaster tolerance capability of the system is detected realistically and accurately through the chaos engineering experiment in a production environment, and whether the system is stable is determined. In addition, observability requirements of the chaos engineering experiment can be met, and an impact on user experience can be minimized.

BRIEF DESCRIPTION OF DRAWINGS

In order to explain the technical solutions in embodiments of the present disclosure or in the prior art more clearly, the drawings that need to be used in the description of the embodiments or the prior art will be briefly introduced in the following. Obviously, the drawings in the following description are some embodiments of the present disclosure, and for those of ordinary skills in the art, other drawings can be obtained according to these drawings without paying creative effort.

DESCRIPTION OF EMBODIMENTS

In order to make the objections, technical solutions and advantages of embodiments of the present disclosure clearer, the technical solutions in the embodiments of the present disclosure will be described clearly and comprehensively with reference to the drawings in the embodiments of the present disclosure. Obviously, the described embodiments are part of the embodiments of the present disclosure, rather than all of them. Based on the embodiments in the present disclosure, all other embodiments obtained by those of ordinary skills in the art without creative effort belong to the protection scope of the present disclosure.

In the prior art, when a chaos engineering experiment is conducted on a distributed system, various failures (such as hardware failures, network delay and isolation, resource exhaustion, Byzantine errors, downstream dependency failures, etc.) will usually be simulated in the system randomly, and disaster tolerance capability of the system is determined through the system state, so as to determine whether the system is stable.

If a real situation of the system is desired, conducting the chaotic engineering experiment in a production environment has the best effect, which can realistically and accurately detect the disaster tolerance capability of the system and determine whether the system is stable.

However, if the chaos engineering experiment is executed in the production environment, the production environment will not be able to provide a service to users normally, which will seriously affect the user experience. If the chaos engineering experiment is executed in a testing environment, although an impact on the user experience can be avoided, observability and coverage of the chaos engineering experiment are insufficient because of the small service request traffic and limited service request traffic types in the testing environment.

In order to solve the above technical problems, in embodiments of the present disclosure, it is considered that not only be it necessary to conduct the chaos engineering experiment in the production environment to ensure the observability and coverage of the chaos engineering experiment, but also it is necessary to provide services to users as normally as possible to reduce the impact on the user experience. A canary cluster is a good choice for conducting the chaos engineering experiment. The canary cluster is a cluster formed by servers in the to-be-tested server cluster for canary release when a service is upgraded. The canary release, also known as grayscale release, refers to a release method that can smoothly transition between black and white, that is, let some users continue to use old product features while other users start to use new product features, and then gradually expand the scope to migrate all users to the new product features. Since the canary cluster belongs to the production environment, and the traffic is usually small and the impact range of the experiment is controllable, the chaos engineering experiment on the canary cluster can realize the chaos engineering experiment in the production environment and reduce the impact on use experience of most users.

However, considering that the traffic of the canary cluster may be less than the minimum required by the chaos engineering experiment, which cannot meet observability requirements of a service stability state of the chaos engineering experiment; or, that the traffic of the canary cluster may exceed the minimum required by the chaos engineering experiment, which increases the impact range of the chaos engineering experiment and affects use experience of more users, in the embodiments of the present disclosure, target service request traffic is first determined, where the target service request traffic is minimum experimental traffic required by a chaotic engineering experiment; service request traffic is adjusted for a canary cluster in a to-be-tested server cluster according to the target service request traffic; and then, an experimental task of the chaos engineering experiment is executed in the canary cluster, and an experimental result is outputted. By dynamically adjusting the service request traffic of the canary cluster, the observability requirements of the chaos engineering experiment can be met in the production environment, and the impact on user experience can be minimized.

Figure 1:
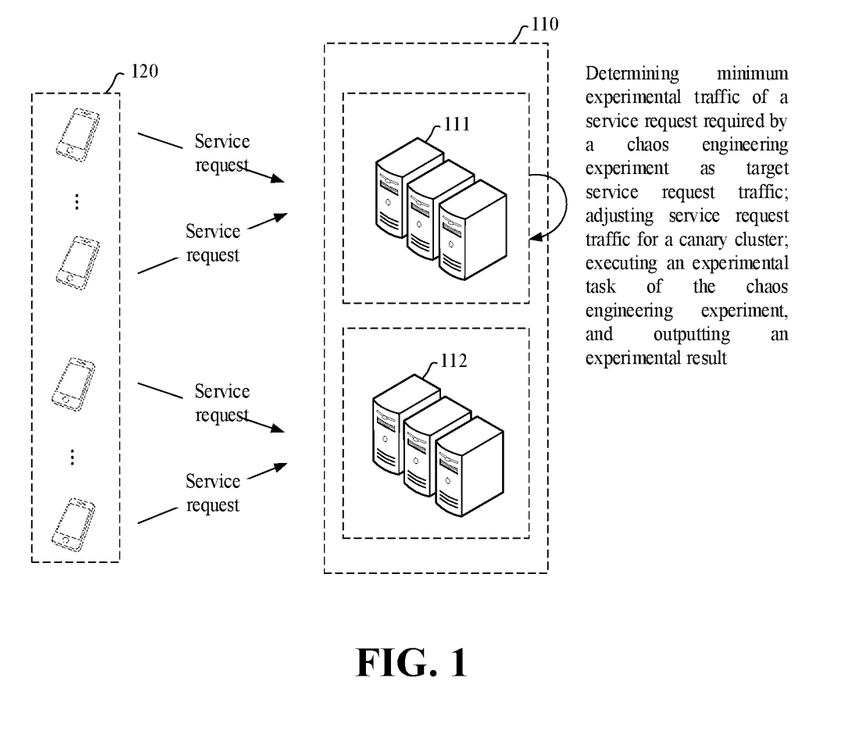
FIG. 1 is a schematic diagram of an application scenario of a chaos engineering experimentation method of a system provided by an embodiment of the present disclosure.

A chaos engineering experimentation method for a system in an embodiment of the present disclosure is applied to an application scenario shown in FIG. 1. The application scenario includes a to-be-tested server cluster 110 and a user terminal 120. The user terminal 120 can send a service request to the to-be-tested server cluster 110, where the to-be-tested server cluster 110 includes a canary cluster 111 and a non-canary cluster 112. The canary cluster 111 is a cluster formed by servers in the to-be-tested server cluster for canary release when a service is upgraded, and the non-canary cluster 112 is a part other than the canary cluster 111 in the to-be-tested server cluster 110. In the embodiment of the present disclosure, it is desired to conduct a chaos engineering experiment in the canary cluster 111, where target service request traffic is determined, the target service request traffic being minimum experimental traffic of a service request required by the chaos engineering experiment; service request traffic is adjusted for the canary cluster 111 according to the target service request traffic; an experimental task of the chaos engineering experiment is executed in the canary cluster 111, and an experimental result is outputted.

The chaos engineering experimentation method for a system provided by the present disclosure will be explained in detail with the following specific embodiments.

Figure 2:
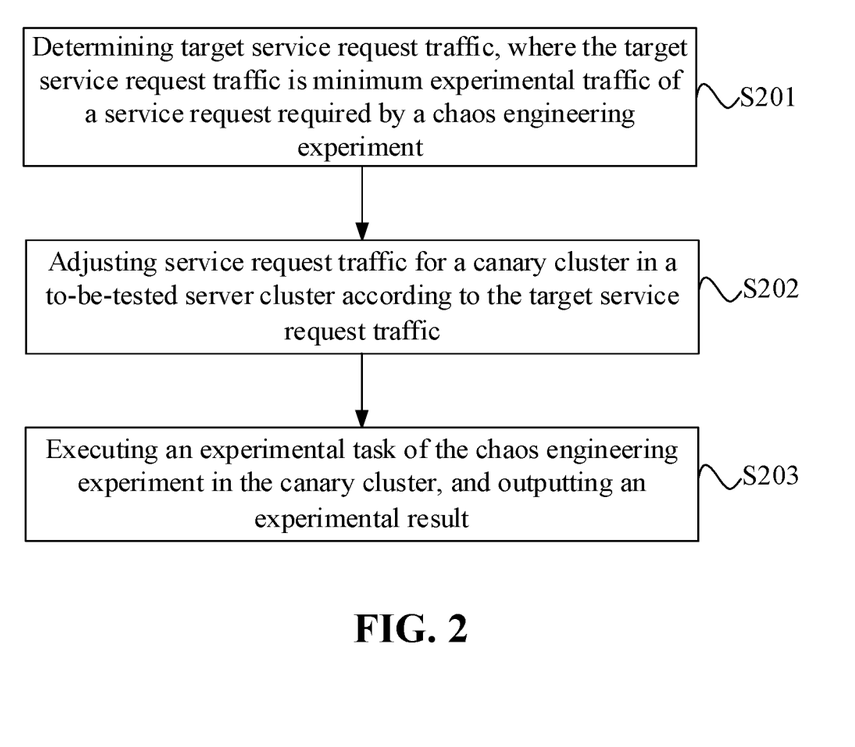
FIG. 2 is a schematic flowchart of a chaos engineering experimentation method for a system provided by an embodiment of the present disclosure.

Referring to FIG. 2, FIG. 2 is a schematic flowchart of a chaos engineering experimentation method for a system provided by an embodiment of the present disclosure. The method of this embodiment can be applied in a terminal device or a server, and the chaos engineering experimentation method for a system includes the following steps.

S201, determining target service request traffic, where the target service request traffic is minimum experimental traffic of a service request required by a chaos engineering experiment.

In this embodiment, a canary cluster is a cluster formed by servers in a to-be-tested server cluster for canary release when a service is upgraded, which belongs to a production environment. Since it is desired to conduct the chaos engineering experiment in the canary cluster, the chaos engineering experiment will still affect users involved in the canary cluster, leading to that the canary cluster may not be able to provide a service to these users normally and use experience of these users is affected. Thus, it is desired that service request traffic of the canary cluster is as small as possible. However, in order to ensure observability and coverage of the chaos engineering experiment, it is also desired that the service request traffic of the canary cluster is large enough to meet observability requirements of a service stability state of the chaos engineering experiment. Therefore, weighing the above factors, it is desired to adjust the service request traffic of the canary cluster to the minimum experimental traffic of the service request required by the chaos engineering experiment, which not only can meet the observability requirements of the chaos engineering experiment in the production environment, but also can minimize the impact on the user experience.

Figure 3:
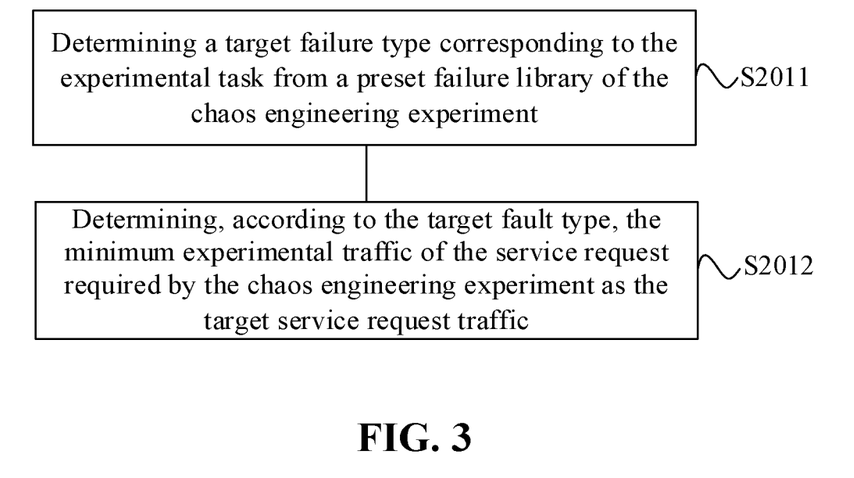
FIG. 3 is a schematic flowchart of a chaos engineering experimentation method for a system provided by another embodiment of the present disclosure.

In this embodiment, as shown in FIG. 3, when determining the target service request traffic, the method may specifically include:

S2011, determining a target failure type corresponding to the experimental task from a preset failure library of the chaos engineering experiment;

S2012, determining, according to the target fault type, the minimum experimental traffic of the service request required by the chaos engineering experiment as the target service request traffic.

In this embodiment, the preset failure library of the chaos engineering experiment may include various failures, and the chaos engineering experiment may randomly simulate various failures, such as hardware failures, network delay and isolation, resource exhaustion, Byzantine errors, downstream dependency failures, etc. As for which specific failures to be randomly simulated, the target failure type corresponding to the experimental task may be determined from the preset failure library of the chaos engineering experiment according to the experimental task. However, an experimentation process of each target failure type may have a different requirement for service request traffic, so it is necessary to determine minimum service request traffic that can meet all experiments for the target failure type according to the target failure type, and determine the minimum experimental traffic of the service request required by the chaos engineering experiment as the target service request traffic. Of course, in the embodiment of the present disclosure, the determination of the minimum experimental traffic of the service request required by the chaos engineering experiment may not be limited to the above manner, which will not be repeated here.

S202, adjusting service request traffic for a canary cluster in a to-be-tested server cluster according to the target service request traffic.

In this embodiment, after determining the target service request traffic, the service request traffic is adjusted for the canary cluster in the to-be-tested server cluster, so that the service request traffic of the canary cluster is adjusted to the target service request traffic.

Figure 4:
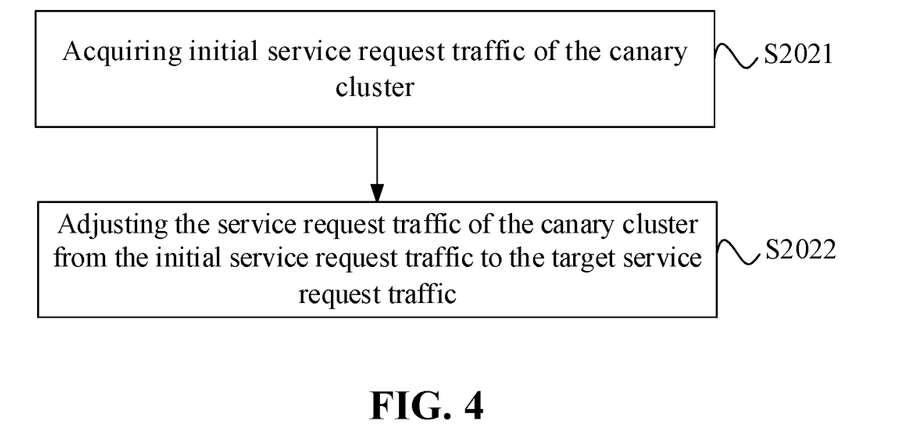
FIG. 4 is a schematic flowchart of a chaos engineering experimentation method for a system provided by another embodiment of the present disclosure.

More specifically, as shown in FIG. 4, when adjusting the service request traffic, the method may specifically include:

S2021, acquiring initial service request traffic of the canary cluster;

S2022, adjusting the service request traffic of the canary cluster from the initial service request traffic to the target service request traffic.

In this embodiment, the initial service request traffic of the canary cluster may first be acquired, and the initial service request traffic may be real-time service request traffic of the canary cluster at the current moment.

Further, if the initial service request traffic of the canary cluster is just equal to the target service request traffic, there is no need to adjust the service request traffic. If the initial service request traffic of the canary cluster is greater than the target service request traffic, part of the service request traffic of the canary cluster is set as service request traffic of a non-canary cluster, so that the service request traffic of the canary cluster is adjusted to the target service request traffic. If the initial service request traffic of the canary cluster is less than the target service request traffic, part of the service request traffic of the non-canary cluster is set as the service request traffic of the canary cluster, so that the service request traffic of the canary cluster is adjusted to the target service request traffic. The non-canary cluster is a part other than the canary cluster in the to-be-tested server cluster.

S203, executing an experimental task of the chaos engineering experiment in the canary cluster, and outputting an experimental result.

In this embodiment, after the service request traffic of the canary cluster is adjusted to the target service request traffic, the experimental task of the chaos engineering experiment can be executed in the canary cluster. That is, various target failures in the experimental task can be randomly simulated in the canary cluster to determine disaster tolerance capability of the canary cluster system and determine whether the system is stable, and the experimental result is outputted as an experimental result of the whole to-be-tested server cluster.

In the chaos engineering experimentation method for a system provided by the embodiments, the target service request traffic is determined, where the target service request traffic is the minimum experimental traffic of the service request required by the chaos engineering experiment; the service request traffic is adjusted for the canary cluster in the to-be-tested server cluster according to the target service request traffic, where the canary cluster is the cluster formed by the servers in the to-be-tested server cluster, the servers being used for canary release when the service is upgraded; the experimental task of the chaos engineering experiment is executed in the canary cluster, and the experimental result is outputted. In the embodiments, the chaos engineering experiment is conducted on the canary cluster, and the service request traffic of the canary cluster is adjusted to the minimum experimental traffic of the service request required by the chaos engineering experiment. In this way, it can be achieved that the disaster tolerance capability of the system can be detected realistically and accurately through the chaos engineering experiment in the production environment, and whether the system is stable is determined. In addition, the observability requirements of the chaos engineering experiment can be met, and the impact on user experience can be minimized.

Figure 5:
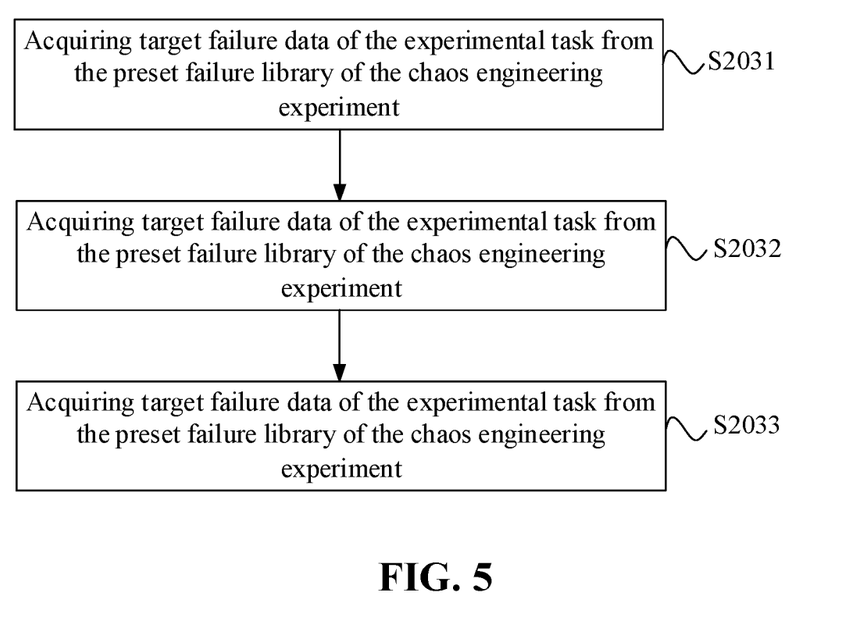
FIG. 5 is a schematic flowchart of a chaos engineering experimentation method for a system provided by another embodiment of the present disclosure.

On the basis of the above embodiments, as shown in FIG. 5, executing the experimental task of the chaos engineering experiment in the canary cluster described in S203 may specifically include:
S2031, acquiring target failure data of the experimental task from the preset failure library of the chaos engineering experiment;
S2032, modifying, according to the target failure data of the experimental task, configuration of the canary cluster, and randomly simulating a situation that a target failure occurs in the canary cluster;
S2032, monitoring a processing state of the canary cluster for a newly received service request, and determining an experimental result of disaster tolerance capability according to the processing state.

In this embodiment, since the chaos engineering experiment needs to randomly simulate the target failure of the experimental task in the canary cluster, the target failure data of the experimental task can be acquired from the preset failure library of the chaos engineering experiment, and then the configuration of the canary cluster can be modified according to the target failure data. For example, the configuration of the canary cluster is modified at any random moment to achieve a random simulation of a target failure occurring in the canary cluster. For example, if it is desired to simulate a hardware failure occurring in the canary cluster, configuration of target hardware in the canary cluster can be modified so that the target hardware no longer provides services. Further, after simulating that the target failure occurs in the canary cluster, the processing state of the canary cluster for the newly received service request can be detected, and the experimental result of disaster tolerance capability can be determined according to the processing state. For example, server A and server B can process the service request at the same time. After simulating that a failure occurs in the server A, whether the newly received service request can be processed normally by server B is monitored, and if it can be processed normally by server B, the disaster tolerance capability is confirmed to be good.

On the basis of any of the above embodiments, after adjusting the service request traffic for the canary cluster in the to-be-tested server cluster according to the target service request traffic described in S203, the method may further include:
detecting real-time service request traffic of the canary cluster within predetermined time;
if the real-time service request traffic of the canary cluster is adjusted to the target service request traffic within the predetermined time, determining that the service request traffic of the canary cluster is adjusted successfully; or
if the real-time service request traffic of the canary cluster is not adjusted to the target service request traffic within the predetermined time, determining that the service request traffic of the canary cluster is adjusted unsuccessfully, and outputting a failure prompt message.

In this embodiment, in order to ensure that the service request traffic of the canary cluster is adjusted successfully, and the chaos engineering experiment can be conducted smoothly, the real-time service request traffic of the canary cluster can be detected within the predetermined time. If the real-time service request traffic of the canary cluster is adjusted to the target service request traffic within the predetermined time, it means that the service request traffic is adjusted successfully, and the experimental task of the chaotic engineering experiment continues to be executed in the canary cluster. Otherwise, if the real-time service request traffic of the canary cluster is not adjusted to the target service request traffic within the predetermined time, it means that the service request traffic is adjusted unsuccessfully. The experimental task of the chaos engineering experiment cannot continue to be executed in the canary cluster at this time, and the failure prompt message can be outputted.

Optionally, in this embodiment, when detecting the real-time service request traffic of the canary cluster within the predetermined time, service request QPS (Queries-per-second, queries per second) can be continuously detected within the predetermined time, so as to determine based on the service request QPS whether the real-time service request traffic of the canary cluster is adjusted to the target service request traffic. Monitoring systems such as Metrics support this function, and the specific process will not be detailed here.

On the basis of the above embodiments, after executing the experimental task of the chaos engineering experiment in the canary cluster described in S203, the method may further include:
adjusting the service request traffic of the canary cluster to the initial service request traffic.

In this embodiment, after the chaos engineering experiment is completed in the canary cluster, an original canary release function of the canary cluster can be restored, and the service request traffic of the canary cluster can be adjusted to the initial service request traffic.

Similarly, when adjusting the canary cluster service request traffic to the initial service request traffic, the real-time service request traffic of the canary cluster can also be detected within predetermined time, so as to determine whether the real-time service request traffic of the canary cluster is adjusted to the initial service request traffic within the predetermined time, and to output a prompt message according to a determination result. For example, if the real-time service request traffic of the canary cluster is adjusted to the initial service request traffic within the predetermined time, a success prompt message is outputted, and if the real-time service request traffic of the canary cluster is not adjusted to the initial service request traffic within the predetermined time, a failure prompt message is outputted. It should be noted that the predetermined time at this time may be the same as or different from the predetermined time for adjusting the real-time service request traffic of the canary cluster to the target service request traffic. In addition, when detecting the real-time service request traffic of the canary cluster within the predetermined time, the service request QPS may still be continuously detected within the predetermined time, which will not be repeated here.

Figure 6:
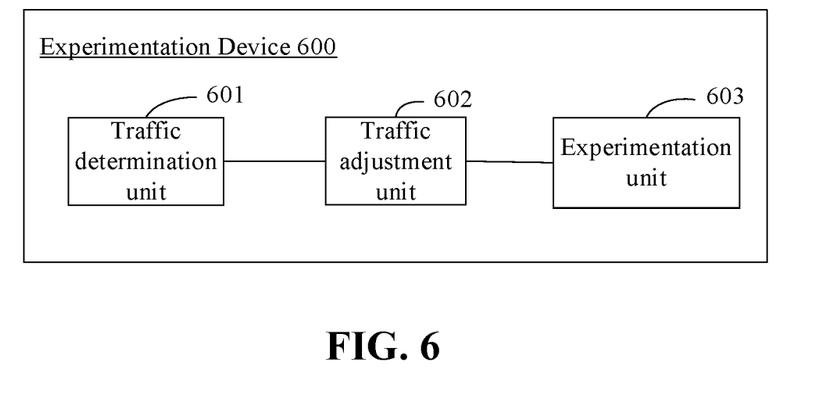
FIG. 6 is a structural block diagram of a chaos engineering experimentation device of a system provided by an embodiment of the present disclosure.

Corresponding to the chaos engineering experimentation method for a system in the above embodiments, FIG. 6 is a structural block diagram of a chaos engineering experimentation device for a system provided by an embodiment of the present disclosure. For convenience of explanation, only parts related to the embodiment of the present disclosure are shown. Referring to FIG. 6, the chaos engineering experimental device 600 for a system includes a traffic determination unit 601, a traffic adjustment unit 602 and an experimentation unit 603.

The traffic determination unit is configured to determine target service request traffic, where the target service request traffic is minimum experimental traffic of a service request required by a chaos engineering experiment;
  the traffic adjustment unit 602 is configured to adjust service request traffic for a canary cluster in a to-be-tested server cluster according to the target service request traffic; where the canary cluster is a cluster formed by servers in the to-be-tested server cluster, the servers being used for canary release when a service is upgraded;
  the experimentation unit 603 is configured to execute an experimental task of the chaos engineering experiment in the canary cluster, and output an experimental result.

In an embodiment of the present disclosure, when determining the target service request traffic, the traffic determination unit 601 is configured to:
  determine a target failure type corresponding to the experimental task from a preset failure library of the chaos engineering experiment;
  determine, according to the target failure type, the minimum experimental traffic of the service request required by the chaos engineering experiment as the target service request traffic.

In an embodiment of the present disclosure, when executing the experimental task of the chaos engineering experiment in the canary cluster, the experimentation unit 603 is configured to:
  acquire target failure data of the experimental task from the preset failure library of the chaos engineering experiment;
  modify, according to the target failure data of the experimental task, configuration of the canary cluster, and randomly simulate a situation that a target failure occurs in the canary cluster;
  monitor a processing state of the canary cluster for a newly received service request, and determine an experimental result of disaster tolerance capability according to the processing state.

In an embodiment of the present disclosure, when adjusting the service request traffic for the canary cluster in the to-be-tested server cluster according to the target service request traffic, the traffic adjustment unit 602 is configured to:
  acquire initial service request traffic of the canary cluster;
  adjust the service request traffic of the canary cluster from the initial service request traffic to the target service request traffic.

In an embodiment of the present disclosure, when adjusting the service request traffic of the canary cluster from the initial service request traffic to the target service request traffic, the traffic adjustment unit 602 is configured to:
  if the initial service request traffic of the canary cluster is greater than the target service request traffic, set part of the service request traffic of the canary cluster as service request traffic of a non-canary cluster, so that the service request traffic of the canary cluster is adjusted to the target service request traffic; or
  if the initial service request traffic of the canary cluster is less than the target service request traffic, set part of service request traffic of a non-canary cluster as the service request traffic of the canary cluster, so that the service request traffic of the canary cluster is adjusted to the target service request traffic;
  where the non-canary cluster is a part other than the canary cluster in the to-be-tested server cluster.

In an embodiment of the present disclosure, after adjusting the service request traffic for the canary cluster in the to-be-tested server cluster according to the target service request traffic, the traffic adjustment unit 602 is further configured to:
  detect real-time service request traffic of the canary cluster within predetermined time;
  if the real-time service request traffic of the canary cluster is adjusted to the target service request traffic within the predetermined time, determine that the service request traffic of the canary cluster is adjusted successfully; or
  if the real-time service request traffic of the canary cluster is not adjusted to the target service request traffic within the predetermined time, determine that the service request traffic of the canary cluster is adjusted unsuccessfully, and output a failure prompt message;
  when executing the experimental task of the chaos engineering experiment in the canary cluster, the experimentation unit 603 is configured to:
  after it is determined that the service request traffic of the canary cluster is adjusted successfully, execute the experimental task of the chaos engineering experiment in the canary cluster.

In an embodiment of the present disclosure, after the experimentation unit 603 executes the experimental task of the chaos engineering experiment in the canary cluster, the traffic adjustment unit 602 is further configured to:
  adjust the service request traffic of the canary cluster to the initial service request traffic.

In an embodiment of the present disclosure, when adjusting the service request traffic of the canary cluster to the initial service request traffic, the traffic adjustment unit 602 is further configured to:
  detect real-time service request traffic of the canary cluster within predetermined time;
  determine whether the real-time service request traffic of the canary cluster is adjusted to the initial service request traffic within the predetermined time, and output a prompt message according to a determination result.

The chaos engineering experimentation device for a system provided by the embodiments can be used to perform the technical solutions of the above embodiments of the chaos engineering experimentation method for a system, and the implementation principles and technical effects thereof are similar and will not be repeated here in this embodiment.

Figure 7:
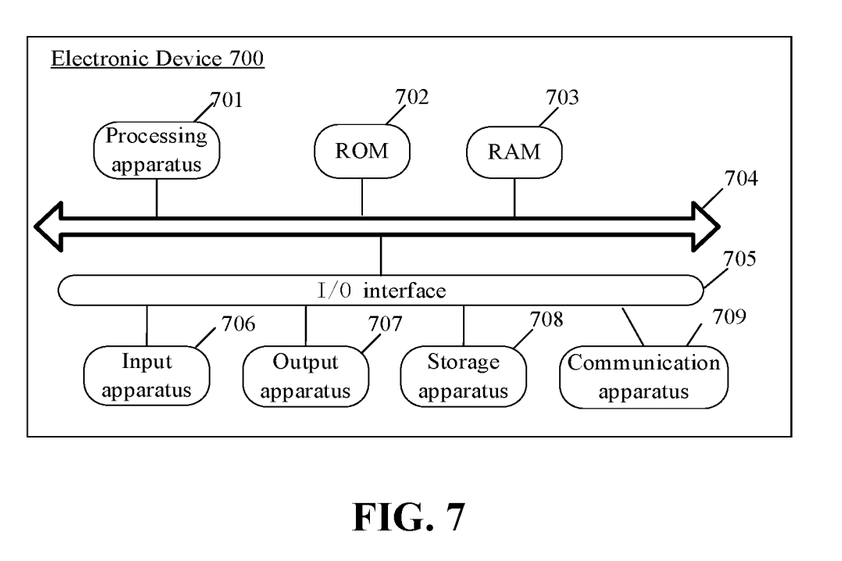
FIG. 7 is a schematic diagram of a hardware structure of an electronic device provided by an embodiment of the present disclosure.

Referring to FIG. 7, FIG. 7 shows a schematic structural diagram of an electronic device 700 suitable for implementing embodiments of the present disclosure. The electronic device 700 may be a terminal device or a server. The terminal device may include, but is not limited to: a mobile terminal such as a mobile phone, a notebook computer, a digital broadcast receiver, a personal digital assistant (PDA for short), a portable android device (PAD for short), a portable media player (PMP for short), an in-vehicle terminal (e.g., an in-vehicle navigation terminal) and so on, and a fixed terminal such as a digital TV, a desktop computer and so on. The electronic device shown in FIG. 7 is only an example, and should not bring any limitation to the functions and the use range of the embodiments of the present disclosure.

As shown in FIG. 7, the electronic device 700 may include a processing apparatus (such as a central processing unit, a graphics processor, etc.) 701, which can execute various appropriate actions and processing according to a program stored in a read only memory (ROM for short) 702 or a program loaded into a random access memory (RAM for short) 703 from a storage apparatus 708. In the RAM 703, various programs and data necessary for operations of the electronic device 700 are also stored. The processing apparatus 701, the ROM 702 and the RAM 703 are connected to each other through a bus 704. An input/output (I/O) interface 705 is also connected to the bus 704.

Usually, the following apparatuses can be connected to the I/O interface 705: an input apparatus 706 including, such as, a touch screen, a touchpad, a keyboard, a mouse, a camera, a microphone, an accelerometer, a gyroscope, etc.; an output apparatus 707 including, such as, a liquid crystal display (LCD for short), a speaker, a vibrator, etc.; the storage apparatus 708 including, such as, a magnetic tape, a hard disk, etc.; and a communication apparatus 709. The communication apparatus 709 can allow the electronic device 700 to communicate wirelessly or through wires with other devices to exchange data. Although FIG. 7 shows the electronic device 700 having various apparatuses, it should be understood that it is not required to implement or have all of the apparatuses illustrated. More or fewer apparatuses may alternatively be implemented or provided.

In particular, according to the embodiments of the present disclosure, the processes described above with reference to the flowcharts can be implemented as a computer software program. For example, an embodiment of the present disclosure includes a computer program product including a computer program carried on a computer-readable medium, where the computer program contains program code for executing the methods shown in the flowcharts. In such embodiment, the computer program can be downloaded and installed from a network through the communication apparatus 709, or installed from the storage apparatus 708, or installed from the ROM 702. When the computer program is executed by the processing apparatus 701, the above functions defined in the methods of the embodiments of the present disclosure are executed.

It should be noted that the above computer-readable medium in the present disclosure may be a computer-readable signal medium or a computer-readable storage medium or any combination of the two. The computer-readable storage medium may be, for example, but not limited to, an electrical, magnetic, optical, electromagnetic, infrared or semiconductor system, apparatus or device, or any combination of the above. More specific examples of the computer-readable storage medium may include, but are not limited to, an electrical connection with one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above. In the present disclosure, the computer-readable storage medium may be any tangible medium containing or storing a program, where the program can be used by or in connection with an instruction execution system, apparatus or device. And in the present disclosure, the computer-readable signal medium may include a data signal propagated in baseband or as a part of a carrier wave, in which computer-readable program code is carried. Such a propagated data signal may take a variety of forms, including but not limited to an electromagnetic signal, an optical signal, or any suitable combination of the above. The computer-readable signal medium may also be any computer-readable medium other than the computer-readable storage medium, and the computer-readable signal medium can send, propagate or transmit a program for use by, or use in combination with, an instruction execution system, apparatus or device. The program code contained on the computer-readable medium may be transmitted using any suitable medium including, but not limited to, an electrical wire, an optical cable, RF (radio frequency) or the like, or any suitable combination of the above.

The above computer-readable medium may be contained in the above electronic device, or may exist separately instead of being assembled into the electronic device.

The above computer-readable medium carries one or more programs. When the one or more programs are executed by the electronic device, the electronic device is caused to execute the methods shown in the above embodiments.

The computer program code for executing the operations of the present disclosure can be written in one or more programming languages or a combination thereof, where the above programming languages include object-oriented programming languages such as Java, Smalltalk, C++, and also conventional procedural programming languages such as "C" language or similar programming languages. The program code may be executed entirely on a user computer, executed partly on a user computer, executed as a stand-alone software package, executed partly on a user computer and partly on a remote computer, or executed entirely on a remote computer or a server. In a case involving a remote computer, the remote computer can be connected to the user computer through any kind of networks, including a local area network (LAN for short) or a wide area network (WAN for short), or can be connected to an external computer (for example, connected through the Internet using an Internet service provider).

The flowcharts and block diagrams in the drawings illustrate architectures, functions and operations of possible implementations of systems, methods and computer program products in accordance with various embodiments of the present disclosure. To this point, each block in the flowcharts or block diagrams may represent a module, a program segment, or a portion of code that contains one or more executable instructions for implementing a specified logical function. It should also be noted that in some alternative implementations, the functions marked in the blocks may also occur in a different order than those marked in the drawings. For example, two blocks shown one after the other can actually be executed in parallel substantially, or they may sometimes be executed in an opposite order, depending on the function involved. It should still be noted that each block in the block diagrams and/or flowcharts, and a combination of blocks in the block diagrams and/or flowcharts, may be implemented with a dedicated hardware-based system that performs specified functions or operations, or may be implemented with a combination of dedicated hardware and computer instructions.

The involved units described in the embodiments of the present disclosure can be implemented by software or hardware. Names of the units do not constitute a limitation on the units per se in some cases. For example, the traffic determination unit may also be described as "a unit for determining target service request traffic".

The above functions described herein may be performed at least in part by one or more hardware logic components. For example, without limitation, exemplary types of hardware logic components that can be used include a field programmable gate array (FPGA for short), an application specific integrated circuit (ASIC for short), an application specific standard product (ASSP for short), a system on a chip (SoC for short), a complex programmable logic device (CPLD for short), etc.

In the context of the present disclosure, the machine readable medium may be a tangible medium that may contain or store a program for use by or in connection with an instruction execution system, apparatus or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device, or any suitable combination of the above contents. More specific examples of the machine-readable storage medium may include an electrical connection based on one or more wires, a portable computer disk, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the above contents.

In a first aspect, according to one or more embodiments of the present disclosure, a chaos engineering experimentation method for a system is provided, including:
    determining target service request traffic, where the target service request traffic is minimum experimental traffic of a service request required by a chaos engineering experiment;
    adjusting service request traffic for a canary cluster in a to-be-tested server cluster according to the target service request traffic; where the canary cluster is a cluster formed by servers in the to-be-tested server cluster, the servers being used for canary release when a service is upgraded;
    executing an experimental task of the chaos engineering experiment in the canary cluster, and outputting an experimental result.

According to one or more embodiments of the present disclosure, determining the target service request traffic includes:
    determining a target failure type corresponding to the experimental task from a preset failure library of the chaos engineering experiment;
    determining, according to the target failure type, the minimum experimental traffic of the service request required by the chaos engineering experiment as the target service request traffic.

According to one or more embodiments of the present disclosure, executing the experimental task of the chaos engineering experiment in the canary cluster includes:
    acquiring target failure data of the experimental task from the preset failure library of the chaos engineering experiment;
    modifying, according to the target failure data of the experimental task, configuration of the canary cluster, and randomly simulating a situation that a target failure occurs in the canary cluster;
    monitoring a processing state of the canary cluster for a newly received service request, and determining an experimental result of disaster tolerance capability according to the processing state.

According to one or more embodiments of the present disclosure, adjusting the service request traffic for the canary cluster in the to-be-tested server cluster according to the target service request traffic includes:
    acquiring initial service request traffic of the canary cluster;
    adjusting the service request traffic of the canary cluster from the initial service request traffic to the target service request traffic.

According to one or more embodiments of the present disclosure, adjusting the service request traffic of the canary cluster from the initial service request traffic to the target service request traffic includes:
    if the initial service request traffic of the canary cluster is greater than the target service request traffic, setting part of the service request traffic of the canary cluster as service request traffic of a non-canary cluster, so that the service request traffic of the canary cluster is adjusted to the target service request traffic; or
    if the initial service request traffic of the canary cluster is less than the target service request traffic, setting part of service request traffic of a non-canary cluster as the service request traffic of the canary cluster, so that the service request traffic of the canary cluster is adjusted to the target service request traffic;
where the non-canary cluster is a part other than the canary cluster in the to-be-tested server cluster.

According to one or more embodiments of the present disclosure, after adjusting the service request traffic for the canary cluster in the to-be-tested server cluster according to the target service request traffic, the method further includes:
    detecting real-time service request traffic of the canary cluster within predetermined time;
    if the real-time service request traffic of the canary cluster is adjusted to the target service request traffic within the predetermined time, determining that the service request traffic of the canary cluster is adjusted successfully; or
    if the real-time service request traffic of the canary cluster is not adjusted to the target service request traffic within the predetermined time, determining that the service request traffic of the canary cluster is adjusted unsuccessfully, and outputting a failure prompt message;
    executing the experimental task of the chaos engineering experiment in the canary cluster includes:
    after it is determined that the service request traffic of the canary cluster is adjusted successfully, executing the experimental task of the chaos engineering experiment in the canary cluster.

According to one or more embodiments of the present disclosure, after executing the experimental task of the chaos engineering experiment in the canary cluster, the method further includes:

adjusting the service request traffic of the canary cluster to the initial service request traffic.

According to one or more embodiments of the present disclosure, when adjusting the service request traffic of the canary cluster to the initial service request traffic, the method further includes:

detecting real-time service request traffic of the canary cluster within predetermined time;

determining whether the real-time service request traffic of the canary cluster is adjusted to the initial service request traffic within the predetermined time, and outputting a prompt message according to a determination result.

In a second aspect, according to one or more embodiments of the present disclosure, a chaos engineering experimentation device for a system is provided, including:

a traffic determination unit, configured to determine target service request traffic, where the target service request traffic is minimum experimental traffic of a service request required by a chaos engineering experiment;

a traffic adjustment unit, configured to adjust, according to the target service request traffic, service request traffic for a canary cluster in a to-be-tested server cluster; where the canary cluster is a cluster formed by servers in the to-be-tested server cluster, the servers being used for canary release when a service is upgraded;

an experimentation unit, configured to execute an experimental task of the chaos engineering experiment in the canary cluster, and output an experimental result.

According to one or more embodiments of the present disclosure, when determining the target service request traffic, the traffic determination unit is configured to:

determine a target failure type corresponding to the experimental task from a preset failure library of the chaos engineering experiment;

determine, according to the target failure type, the minimum experimental traffic of the service request required by the chaos engineering experiment as the target service request traffic.

According to one or more embodiments of the present disclosure, when executing the experimental task of the chaos engineering experiment in the canary cluster, the experimentation unit is configured to:

acquire target failure data of the experimental task from the preset failure library of the chaos engineering experiment;

modify, according to the target failure data of the experimental task, configuration of the canary cluster, and randomly simulate a situation that a target failure occurs in the canary cluster;

monitor a processing state of the canary cluster for a newly received service request, and determine an experimental result of disaster tolerance capability according to the processing state.

According to one or more embodiments of the present disclosure, when adjusting, according to the target service request traffic, the service request traffic for the canary cluster in the to-be-tested server cluster, the traffic adjustment unit is configured to:

acquire initial service request traffic of the canary cluster;

adjust the service request traffic of the canary cluster from the initial service request traffic to the target service request traffic.

According to one or more embodiments of the present disclosure, when adjusting the service request traffic of the canary cluster from the initial service request traffic to the target service request traffic, the traffic adjustment unit is configured to:

if the initial service request traffic of the canary cluster is greater than the target service request traffic, set part of the service request traffic of the canary cluster as service request traffic of a non-canary cluster, so that the service request traffic of the canary cluster is adjusted to the target service request traffic; or     if the initial service request traffic of the canary cluster is less than the target service request traffic, set part of the service request traffic of the non-canary cluster as the service request traffic of the canary cluster, so that the service request traffic of the canary cluster is adjusted to the target service request traffic;

where the non-canary cluster is a part other than the canary cluster in the to-be-tested server cluster.

According to one or more embodiments of the present disclosure, after adjusting the service request traffic for the canary cluster in the to-be-tested server cluster according to the target service request traffic, the traffic adjustment unit is further configured to:

detect real-time service request traffic of the canary cluster within predetermined time;

if the real-time service request traffic of the canary cluster is adjusted to the target service request traffic within the predetermined time, determine that the service request traffic of the canary cluster is adjusted successfully; or     if the real-time service request traffic of the canary cluster is not adjusted to the target service request traffic within the predetermined time, determine that the service request traffic of the canary cluster is adjusted unsuccessfully, and output a failure prompt message;

when executing the experimental task of the chaos engineering experiment in the canary cluster, the experimentation unit is configured to:

after it is determined that the service request traffic of the canary cluster is adjusted successfully, execute the experimental task of the chaos engineering experiment in the canary cluster.

According to one or more embodiments of the present disclosure, after the experimentation unit executes the experimental task of the chaos engineering experiment in the canary cluster, the traffic adjustment unit is further configured to:

adjust the service request traffic of the canary cluster to the initial service request traffic.

According to one or more embodiments of the present disclosure, when adjusting the service request traffic of the canary cluster to the initial service request traffic, the traffic adjustment unit is further configured to:

detect real-time service request traffic of the canary cluster within predetermined time;

determine whether the real-time service request traffic of the canary cluster is adjusted to the initial service request traffic within the predetermined time, and output a prompt message according to a determination result.

In a third aspect, according to one or more embodiments of the present disclosure, an electronic device is provided, including: at least one processor and a memory;

where the memory stores computer-execution instructions;

the at least one processor executes the computer-execution instructions stored in the memory to cause the at least one processor to execute the chaos engineering experimentation method for a system according to the first aspect and various possible designs of the first aspect as described above.

In a fourth aspect, according to one or more embodiments of the present disclosure, a computer-readable storage medium is provided, where the computer-readable storage medium stores computer-execution instructions, and when a processor executes the computer-execution instructions, the chaos engineering experimentation method for a system according to the first aspect and various possible designs of the first aspect as described above is implemented.

In a fifth aspect, according to one or more embodiments of the present disclosure, a computer program product is provided, including computer instructions, where the chaos engineering experimentation method for a system according to the first aspect and various possible designs of the first aspect as described above is implemented when the computer instructions are executed by a processor.

In a sixth aspect, according to one or more embodiments of the present disclosure, a computer program is provided, where the chaos engineering experimentation method for a system according to the first aspect and various possible designs of the first aspect as described above is implemented when the computer program is executed by a processor.

The above description is only a description of preferred embodiments of the present disclosure and applied technical principles. It should be understood by those skilled in the art that the disclosure scope involved in the present disclosure is not limited to the technical solutions formed by the specific combinations of the above technical features, but also covers other technical solutions formed by any combination of the above technical features or equivalent features thereof without departing from the above disclosure concept, for example, a technical solution formed by replacing the above features with the technical features with similar functions disclosed in (but not limited to) the present disclosure.

In addition, although the operations are depicted in a particular order, this should not be understood as requiring that the operations are performed in the particular order shown or in a sequential order. Under certain circumstances, multitasking and parallel processing may be advantageous. Similarly, although several specific implementation details are included in the above discussion, these should not be interpreted as limitations on the scope of the present disclosure. Certain features described in the context of separate embodiments may also be implemented in a single embodiment in combination. On the contrary, various features described in the context of a single embodiment may also be implemented in multiple embodiments individually or in any suitable sub-combination.

Although the subject matter has been described in language specific to structural features and/or logical actions of methods, it should be understood that the subject matter defined in the appended claims is not necessarily limited to the specific features or actions described above. On the contrary, the specific features and actions described above are merely exemplary forms for implementing the claims.

What is claimed is:

1. A chaos engineering experimentation method for a system, comprising:
   determining target service request traffic, wherein the target service request traffic is minimum experimental traffic of a service request required by a chaos engineering experiment, and the chaos engineering experiment is configured to detect a disaster tolerance capability of the system in a production environment;
   acquiring initial service request traffic of a canary cluster; wherein the canary cluster is a cluster formed by servers in a to-be-tested server cluster, the servers being used for canary release when a service is upgraded, and the canary cluster belongs to the production environment;
   upon determining that the initial service request traffic of the canary cluster is greater than the target service request traffic, setting part of service request traffic of the canary cluster as service request traffic of a non-canary cluster, so that the service request traffic of the canary cluster is reduced to the target service request traffic; or upon determining that the initial service request traffic of the canary cluster is less than the target service request traffic, setting part of the service request traffic of the non-canary cluster as the service request traffic of the canary cluster, so that the service request traffic of the canary cluster is increased to the target service request traffic; wherein the non-canary cluster is a part other than the canary cluster in the to-be-tested server cluster; and
   executing an experimental task of the chaos engineering experiment in the canary cluster, and outputting an experimental result.

2. The chaos engineering experimentation method for a system according to claim 1, wherein determining the target service request traffic comprises:
   determining a target failure type corresponding to the experimental task from a preset failure library of the chaos engineering experiment;
   determining, according to the target fault type, the minimum experimental traffic of the service request required by the chaos engineering experiment as the target service request traffic.

3. The chaos engineering experimentation method for a system according to claim 1, wherein executing the experimental task of the chaos engineering experiment in the canary cluster comprises:
   acquiring target failure data of the experimental task from a preset failure library of the chaos engineering experiment;
   modifying, according to the target failure data of the experimental task, configuration of the canary cluster, and randomly simulating a situation that a target failure occurs in the canary cluster;
   monitoring a processing state of the canary cluster for a newly received service request, and determining an experimental result of the disaster tolerance capability according to the processing state.

4. The chaos engineering experimentation method for a system according to claim 1, after the service request traffic of the canary cluster being reduced or increased to the target service request traffic, further comprising:
   detecting real-time service request traffic of the canary cluster within predetermined time;
   upon determining that the real-time service request traffic of the canary cluster is adjusted to the target service request traffic within the predetermined time, determining that the service request traffic of the canary cluster is adjusted successfully; or
   upon determining that the real-time service request traffic of the canary cluster is not adjusted to the target service request traffic within the predetermined time, determining that the service request traffic of the canary cluster is adjusted unsuccessfully, and outputting a failure prompt message;

executing the experimental task of the chaos engineering experiment in the canary cluster comprises:
after it is determined that the service request traffic of the canary cluster is adjusted successfully, executing the experimental task of the chaos engineering experiment in the canary cluster.

5. The chaos engineering experimentation method for a system according to claim 1, after executing the experimental task of the chaos engineering experiment in the canary cluster, further comprising:
adjusting the service request traffic of the canary cluster to the initial service request traffic.

6. The chaos engineering experimentation method for a system according to claim 5, wherein adjusting the service request traffic of the canary cluster to the initial service request traffic, the method further comprises:
detecting real-time service request traffic of the canary cluster within predetermined time;
determining whether the real-time service request traffic of the canary cluster is adjusted to the initial service request traffic within the predetermined time, and outputting a prompt message according to a determination result.

7. A chaos engineering experimentation device for a system, comprising:
memory that stores computer-execution instructions; and
at least one processor configured to execute the computer-execution instructions stored in the memory to cause the at least one processor to:
determine target service request traffic, wherein the target service request traffic is minimum experimental traffic of a service request required by a chaos engineering experiment, and the chaos engineering experiment is configured to detect a disaster tolerance capability of the system in a production environment;
acquire initial service request traffic of a canary cluster; wherein the canary cluster is a cluster formed by servers in a to-be-tested server cluster, the servers being used for canary release when a service is upgraded, and the canary cluster belongs to the production environment;
upon determining that the initial service request traffic of the canary cluster is greater than the target service request traffic, set part of service request traffic of the canary cluster as service request traffic of a non-canary cluster, so that the service request traffic of the canary cluster is reduced to the target service request traffic; or upon determining that the initial service request traffic of the canary cluster is less than the target service request traffic, set part of the service request traffic of the non-canary cluster as the service request traffic of the canary cluster, so that the service request traffic of the canary cluster is increased to the target service request traffic; wherein the non-canary cluster is a part other than the canary cluster in the to-be-tested server cluster; and
execute an experimental task of the chaos engineering experiment in the canary cluster, and output an experimental result.

8. A non-transitory computer-readable storage medium, wherein the computer-readable storage medium stores computer-execution instructions, and when a processor executes the computer-execution instructions, the processor is caused to:
determine target service request traffic, wherein the target service request traffic is minimum experimental traffic of a service request required by a chaos engineering experiment, and the chaos engineering experiment is configured to detect a disaster tolerance capability of a system in a production environment;
acquire initial service request traffic of a canary cluster; wherein the canary cluster is a cluster formed by servers in a to-be-tested server cluster, the servers being used for canary release when a service is upgraded, and the canary cluster belongs to the production environment;
upon determining that the initial service request traffic of the canary cluster is greater than the target service request traffic, set part of service request traffic of the canary cluster as service request traffic of a non-canary cluster, so that the service request traffic of the canary cluster is reduced to the target service request traffic; or upon determining that the initial service request traffic of the canary cluster is less than the target service request traffic, set part of the service request traffic of the non-canary cluster as the service request traffic of the canary cluster, so that the service request traffic of the canary cluster is increased to the target service request traffic; wherein the non-canary cluster is a part other than the canary cluster in the to-be-tested server cluster; and
execute an experimental task of the chaos engineering experiment in the canary cluster, and output an experimental result.

9. The chaos engineering experimentation method for a system according to claim 2, wherein executing the experimental task of the chaos engineering experiment in the canary cluster comprises:
acquiring target failure data of the experimental task from a preset failure library of the chaos engineering experiment;
modifying, according to the target failure data of the experimental task, configuration of the canary cluster, and randomly simulating a situation that a target failure occurs in the canary cluster;
monitoring a processing state of the canary cluster for a newly received service request, and determining an experimental result of the disaster tolerance capability according to the processing state.

10. The device according to claim 7, wherein the at least one processor executes the computer-execution instructions stored in the memory to cause the at least one processor to:
determine a target failure type corresponding to the experimental task from a preset failure library of the chaos engineering experiment;
determine, according to the target fault type, the minimum experimental traffic of the service request required by the chaos engineering experiment as the target service request traffic.

11. The device according to claim 7, wherein the at least one processor executes the computer-execution instructions stored in the memory to cause the at least one processor to:
acquire target failure data of the experimental task from a preset failure library of the chaos engineering experiment;
modify, according to the target failure data of the experimental task, configuration of the canary cluster, and randomly simulating a situation that a target failure occurs in the canary cluster;
monitor a processing state of the canary cluster for a newly received service request, and determine an experimental result of the disaster tolerance capability according to the processing state.

12. The device according to claim 10, wherein the at least one processor executes the computer-execution instructions stored in the memory to cause the at least one processor to:
- acquire target failure data of the experimental task from a preset failure library of the chaos engineering experiment;
- modify, according to the target failure data of the experimental task, configuration of the canary cluster, and randomly simulating a situation that a target failure occurs in the canary cluster;
- monitor a processing state of the canary cluster for a newly received service request, and determine an experimental result of the disaster tolerance capability according to the processing state.

13. The device according to claim 7, wherein the at least one processor executes the computer-execution instructions stored in the memory to cause the at least one processor to:
- detect real-time service request traffic of the canary cluster within predetermined time;
- upon determining that the real-time service request traffic of the canary cluster is adjusted to the target service request traffic within the predetermined time, determine that the service request traffic of the canary cluster is adjusted successfully; or
- upon determining that the real-time service request traffic of the canary cluster is not adjusted to the target service request traffic within the predetermined time, determine that the service request traffic of the canary cluster is adjusted unsuccessfully, and output a failure prompt message;
- when executing the experimental task of the chaos engineering experiment in the canary cluster, the at least one processor is caused to:
  - after it is determined that the service request traffic of the canary cluster is adjusted successfully, execute the experimental task of the chaos engineering experiment in the canary cluster.

14. The device according to claim 7, wherein the at least one processor executes the computer-execution instructions stored in the memory to cause the at least one processor to:
- adjust the service request traffic of the canary cluster to the initial service request traffic.

15. The device according to claim 14, wherein when adjusting the service request traffic of the canary cluster to the initial service request traffic, the at least one processor is caused to:
- detect real-time service request traffic of the canary cluster within predetermined time;
- determine whether the real-time service request traffic of the canary cluster is adjusted to the initial service request traffic within the predetermined time, and output a prompt message according to a determination result.

16. The non-transitory computer-readable storage medium according to claim 8, wherein when a processor executes the computer-execution instructions the processor is caused to:
- determine a target failure type corresponding to the experimental task from a preset failure library of the chaos engineering experiment;
- determine, according to the target fault type, the minimum experimental traffic of the service request required by the chaos engineering experiment as the target service request traffic.

* * * * *